US012610888B2

(12) United States Patent
Dittmer

(10) Patent No.: US 12,610,888 B2
(45) Date of Patent: Apr. 28, 2026

(54) RETRACTABLE CROP DIVIDER OF AN AGRICULTURAL HEADER

(71) Applicant: DEERE & COMPANY, Moline, IL (US)

(72) Inventor: Colburn L. Dittmer, Polk City, IA (US)

(73) Assignee: Deere & Company, Moline, IL (US)

( * ) Notice: Subject to any disclaimer, the term of this patent is extended or adjusted under 35 U.S.C. 154(b) by 740 days.

(21) Appl. No.: 17/975,784

(22) Filed: Oct. 28, 2022

(65) Prior Publication Data

US 2024/0138307 A1 May 2, 2024

(51) Int. Cl.
*A01D 57/01* (2006.01)
*A01D 45/02* (2006.01)

(52) U.S. Cl.
CPC ........... *A01D 57/01* (2013.01); *A01D 45/021* (2013.01)

(58) Field of Classification Search
CPC .............................. A01D 57/01; A01D 45/021
See application file for complete search history.

(56) References Cited

U.S. PATENT DOCUMENTS

| | | | |
|---|---|---|---|
| 3,387,440 A | 6/1968 | Karlsson | |
| 6,247,297 B1 * | 6/2001 | Becker | A01D 45/021 56/119 |
| 6,513,313 B1 * | 2/2003 | Bennett | A01D 45/021 56/319 |
| 2014/0260165 A1 * | 9/2014 | Lohrentz | A01D 63/00 56/119 |
| 2022/0000029 A1 | 1/2022 | Ricketts et al. | |

FOREIGN PATENT DOCUMENTS

| | | | | |
|---|---|---|---|---|
| DE | 10016824 A1 * | 10/2001 | .......... | A01D 45/021 |
| EP | 2992750 B1 * | 8/2017 | .......... | A01B 73/048 |
| WO | 2020097229 A1 | 5/2020 | | |

OTHER PUBLICATIONS

English Language translation of DE 10016824 (Year: 2001).*

* cited by examiner

*Primary Examiner* — Claude J Brown
(74) *Attorney, Agent, or Firm* — Taft Stettinius & Hollister LLP; Stephen F. Rost

(57) ABSTRACT

A crop divider assembly of an agricultural header includes a first portion pivotally coupled to a frame of the header and a second portion having a first end and a second end. The second end is pivotally coupled to the first portion. The first end forms a leading end of the crop divider assembly. The crop divider assembly is moveable to a first configuration in which the first portion and second portion are at least partially aligned with one another and the first end is in a fully extended position, a second configuration in which the second portion is pivoted at an angle relative to the first portion such that the first end is moved rearwardly from the fully extended position to a retracted position, and a third configuration in which the second portion is pivoted relative to the first portion and the first end is positioned rearward from the fully extended position.

19 Claims, 8 Drawing Sheets

200

202

210

206

208

204

212

228

234

226

234

224

234

222

234

220

234

218

234

216

234

214

232

234

230

234

RETRACTABLE CROP DIVIDER OF AN AGRICULTURAL HEADER

FIELD OF THE DISCLOSURE

The present disclosure relates to an agricultural header, and in particular, to a retractable crop divider on an agricultural header.

BACKGROUND

A header of an agricultural machine such as a harvester or agricultural combine is provided with crop dividers. The crop divider is designed for directing rows of crops and crop material, such as corn stalks with corn ears, downstream to a separating assembly on the header. For harvesting corn, crop dividers, which are commonly known as "snoots," direct the corn stalks to row units including stalk receiving slots and stripping plates, snapping rolls, and opposed rearwardly moving gathering chains. Thus, following separation of the ears from the stalks by the snapping rolls and stripping plates (also known as stalk rolls and deck plates, respectively), the separated ears are delivered rearwardly to an auger which conveys the harvested ears to a feederhouse of the agricultural combine.

SUMMARY

In one implementation of the present disclosure, a crop divider assembly of an agricultural header includes a first portion configured to be pivotally coupled to a frame of the header, and a second portion including a first end forming a leading end of the crop divider assembly and a second end pivotally coupled to the first portion. The crop divider assembly is moveable between a first configuration and a second configuration during a harvesting operation, where in the first configuration the first portion and the second portion are at least partially axially aligned with one another and the first end is in a fully extended position, and in the second configuration the second portion is pivoted relative to the first portion and the first end is freely moved rearwardly from the fully extended position to a retracted position.

In one example of this implementation, the first end is freely movable between the fully extended position and the retracted position. In a second example, the first end freely moves from the retracted position to the fully extended position in response to the crop divider assembly being biased to the first configuration. In a third example, between the first configuration and the second configuration, the first end moves along a generally horizontal path between the fully extended position and the retracted position. In a fourth example, the first end is raised as the crop divider assembly moves from the fully extended position to the retracted position.

In a fifth example of this implementation, the first portion and second portion are pivotally coupled at a first pivot location; and wherein, the first pivot location moves upwardly when the crop divider assembly is moved from the first configuration to the second configuration. In a sixth example, a biasing member includes a first end and a second end, opposite the first end, where the first end is coupled to one of the first portion or the second portion and the second end is configured to be coupled to the frame. The biasing member biases the crop divider assembly to the first configuration. In a seventh example, the biasing member includes a spring or an actuator. In a further example, the first portion and second portion are pivotally coupled at a first pivot location that defines a pivot axis, and the biasing member is coupled to the first portion or second portion along the pivot axis.

In another implementation of this disclosure, a crop divider assembly of an agricultural header includes a first portion configured to be pivotally coupled to a frame of the header, and a second portion including a first end forming a leading end of the crop divider assembly and a second end pivotally coupled to the first portion. The crop divider assembly is moveable to a first configuration in which the first portion and the second portion are at least partially axially aligned with one another and the first end is in a fully extended position, a second configuration in which the second portion is pivoted relative to the first portion and the first end is moved rearwardly from the fully extended position to a retracted position, and a third configuration in which the second portion is pivoted relative to the first portion and the first end is positioned rearward from the fully extended position. The crop divider assembly is biased to the first configuration such that when the crop divider assembly is in the second configuration, the first end is freely movable from the retracted position to the fully extended position in response to the crop divider assembly being biased to the first configuration.

In one example of this implementation, when the crop divider assembly is in the third configuration, the first end is unable to freely move to the fully extended position. In a second example, the first end is freely movable between the fully extended position and the retracted position. In a third example, a biasing member includes a first end and a second end, opposite the first end, where the first end is coupled to one of the first portion or the second portion and the second end is configured to be coupled to the frame. The biasing member biases the crop divider assembly to the first configuration.

In a fourth example, the first portion and second portion are pivotally coupled at a first pivot location that defines a pivot axis, and the biasing member is coupled to the first portion or second portion along the pivot axis. In a fifth example, a bracket is pivotally coupled to the first portion, a biasing member is pivotally coupled at a first end to the bracket and configured to be pivotally coupled at a second end opposite the first end to the frame, and an arm is pivotally coupled at a first end to the bracket and configured to be pivotally coupled at a second end opposite the first end to the frame. The biasing member is movable between a retracted position and an extended position, and, in the extended position, the crop divider assembly is in the third configuration. In another example, the bracket is pivotally coupled to a flange of the first portion.

In a further implementation of the present disclosure, an agricultural header for feeding separated crop to a harvester includes a frame and a plurality of crop divider assemblies coupled to the frame. Each of the plurality of crop divider assemblies is spaced from another of the plurality of crop divider assemblies and includes a first portion pivotally coupled to the frame and a second portion pivotally coupled to the first portion. The second portion includes a first end forming a leading end of the crop divider assembly and a second end pivotally coupled to the first portion. Each crop divider assembly of the plurality of crop divider assemblies is moveable between a first configuration and a second configuration during a harvesting operation, where in the first configuration the first portion and the second portion are at least partially axially aligned with one another and the first end is in a fully extended position, and in the second configuration the second portion is pivoted relative to the first portion and the first end is moved rearwardly from the fully extended position to a retracted position. Each crop divider assembly of the plurality of crop divider assemblies is biased to the first configuration such that, when the crop divider assembly is in the second configuration, the first end freely moves from the retracted position to the fully extended position in response to the crop divider assembly being biased to the first configuration.

In one example of this implementation, each crop divider assembly of the plurality of crop divider assemblies is moveable to a third configuration during a non-harvesting operation in which the second portion is pivoted relative to the first portion and the first end is positioned rearward from the fully extended position. In another example, when the crop divider assembly is in the third configuration, the first end is unable to freely move to the fully extended position. In a further example, the first end of each crop divider assembly of the plurality of crop divider assemblies is freely movable between the fully extended position and the retracted position.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

Figure 1:
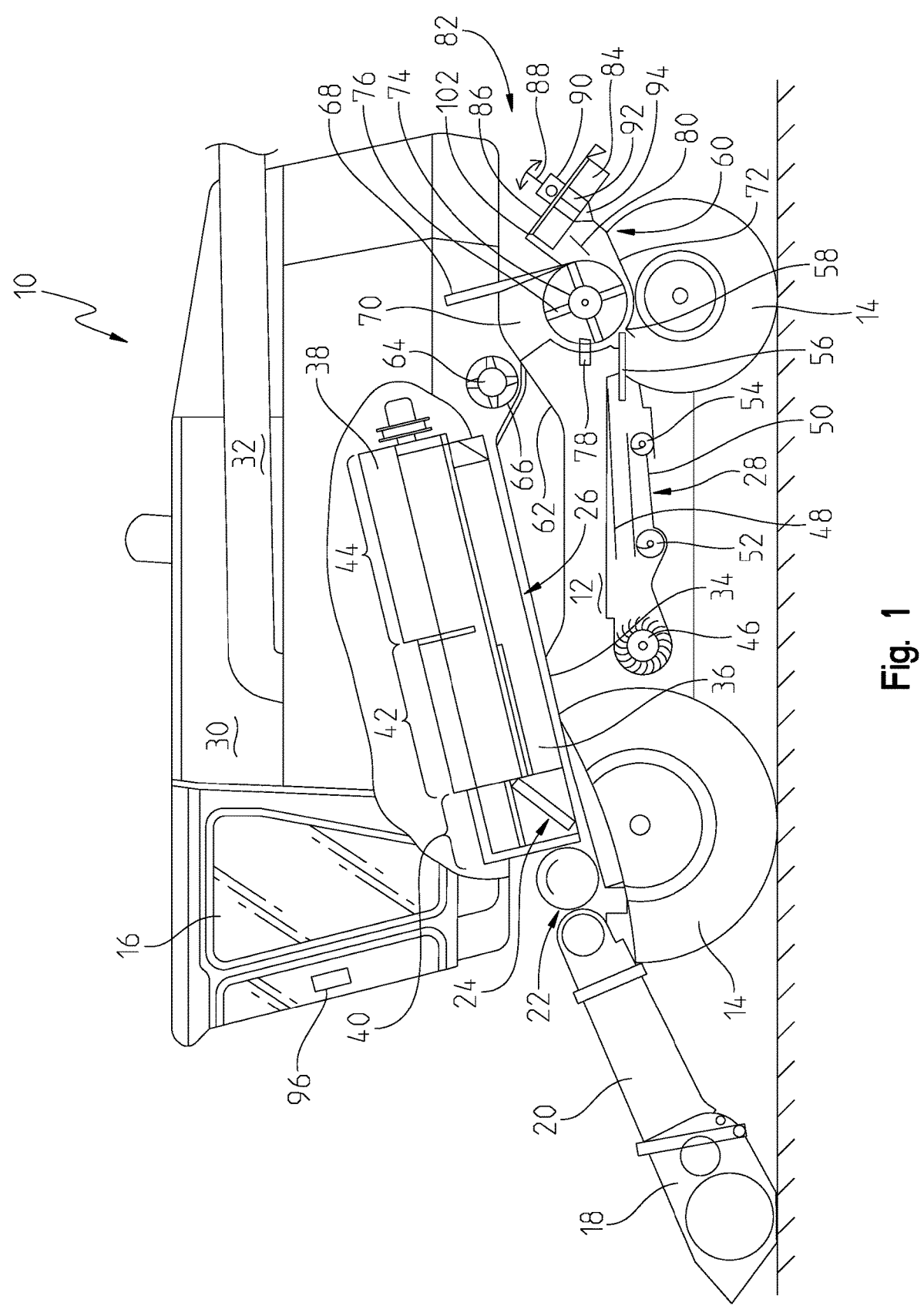
FIG. 1 is a partial section of a side view of an example agricultural vehicle with an agricultural header according to the present disclosure.

For the purposes of promoting an understanding of the principles of the present disclosure, reference will now be made to the implementations described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

In FIG. 1, an illustrative implementation is provided of a work machine. In this implementation, the work machine is depicted as an agricultural vehicle, and in particular, to an agricultural combine 10. The present disclosure, however, is not limited to an agricultural combine or any other agricultural vehicle. The work machine or vehicle may be any type of agricultural, construction, forestry, industrial, or off-road machine or vehicle. Moreover, the terms "machine" and "vehicle" are used interchangeably in this disclosure to refer to the same thing.

In the implementation of FIG. 1, an agricultural combine 10 is shown with a chassis 12 and one or more ground supporting mechanism such as one or more wheels 14 that are in contact with the ground. Wheels 14 are coupled to the chassis 12 and are used for transporting the agricultural combine 10 over the ground, such as providing a forward propulsion of the agricultural combine 10 in a forward operating or travelling direction. The forward operating direction is to the left in FIG. 1. The operation of the agricultural combine 10 is controlled from an operator's cab 16. The operator's cab 16 may include any number of controls including an operator terminal or controls 96 for controlling the operation of the agricultural combine 10. An agricultural header 18 may form part of an implement attached to the agricultural combine 10. Alternatively, the agricultural header 18 may form part of the agricultural combine and thus is mounted to the chassis 12. In any event, the agricultural header 18 may be disposed at a forward end of the agricultural combine 10 and is used to harvest crop such as corn and to conduct the harvested crop to a slope conveyor 20. The harvested crop may be conducted to a guide drum 22 via a slope conveyor 20. The guide drum 22 guides the harvested crop through an inlet transition section 24 to an axial harvested crop processing arrangement 26, as shown in FIG. 1.

The harvested crop processing arrangement 26 may include a rotor housing 34 and a rotor 36 arranged therein. The rotor 36 includes a hollow drum 38 to which crop processing elements are fastened for a charging section 40, a threshing section 42, and a separating section 44. The charging section 40 is arranged at the front end of the axial harvested crop processing arrangement 26. The threshing section 42 and the separating section 44 are located downstream in the longitudinal direction and to the rear of the charging section 40. The drum 38 may be in the form of a truncated cone located in the charging section 40. The threshing section 42 may include a forward section in the form of a truncated cone and a cylindrical rear section. The cylindrical separating section 44 of the drum 38 is located at the rear or end of the axial harvested crop processing unit 26. In place of the axial harvested crop processing unit 26, a tangential threshing drum with a following axial threshing section or a straw chopper could also be used.

Grain and chaff that fall through a thresher basket associated with the threshing section 42 and through a separating grate associated with the separating section 44 may be directed to a cleaning system 28 with a blower 46 and sieves 48, 50 with louvers. The sieves 48, 50 can be oscillated in a fore-and-aft direction. The cleaning system 28 removes the chaff and guides the clean grain over a screw conveyor 52 to an elevator for clean grain (not shown). The elevator for clean grain deposits the clean grain in a grain tank 30, as shown in FIG. 1. The clean grain in the grain tank 30 can be unloaded by an unloading screw conveyor 32 to a grain wagon, trailer, or truck (not shown). Harvested crop remaining at the lower end of the lower sieve 50 is again transported to the harvested crop processing arrangement 26 by a screw conveyor 54 and an overhead conveyor (not shown). The harvested crop residue delivered at the upper end of the upper sieve 48 that consist essentially of chaff and small straw particles may be conveyed by an oscillating sheet conveyor 56 to the rear and to a lower inlet 58 of a chopper rotor assembly 60.

The aforementioned blower 46 produces an air flow that carries much of the chaff and small particles to the rear of the agricultural combine and to the chopper rotor assembly 60. The blower 46 is capable of providing three or more air paths inside the agricultural combine. A first air or flow path may be through a front portion of the agricultural combine 10. A second air or flow path may be above the lower sieve 50 and below the upper sieve 48 or chaffer. A third air or flow path may be below the lower sieve 50. All three air or flow paths fill the agricultural combine body and can create pressurized air flow to pick up and carry straw, grain, and other residue or particles to the rear of the agricultural combine 10.

Threshed-out straw leaving the separating section 44 is ejected through an outlet 62 from the harvested crop processing arrangement 26 and conducted to an ejection drum 64. The ejection drum 64, or discharge beater, interacts with a sheet 66 arranged underneath the ejection drum 64 to eject the straw to the rear, and the grain and MOG is directed through the cleaning system 28. A wall 68 is located to the rear of the ejection drum 64. The wall 68 guides the straw into an upper inlet 70 of the chopper rotor assembly 60.

The chopper rotor assembly 60 may include a housing 72 (i.e., chopper housing) with a rotor 74 arranged therein that can rotate in a counterclockwise direction about an axis extending horizontally and transverse to the direction of operation. The rotor 74 may include a plurality of chopper knives 76, pendulously suspended in pairs and distributed around the circumference of the rotor 74, that interact with opposing knives 78, which are fixed to the housing 72. Two impeller blowers 82 arranged side by side alongside each other, may be provided downstream of an outlet 80 of the chopper rotor assembly 60. Only a single blower 82 is shown in FIG. 1. The impeller blowers 82 may include a number of impeller blades 84, each of which is connected rigidly to an upper circular disk 86, that can rotate about central axes 88. The disks 86 with the impeller blades 84 that extend radially can be rotatably driven by a hydraulic motor 90 that is attached above a bottom sheet 102 which is connected with the housing 72 of the chopper rotor assembly 60. At their radially inner ends the impeller blades 84 are connected to a cylindrical central body 92 that transitions into a cone 94 with a point on the end facing away from the disk 86. The impeller blades 84 may be rectangular and the height of the body 92 (without cone 94) may be equal to the height of the impeller blades 84. The cross section of the body 92 and the cone 94 may be circular, although the cross section could also have a multifaceted shape.

Figure 2:
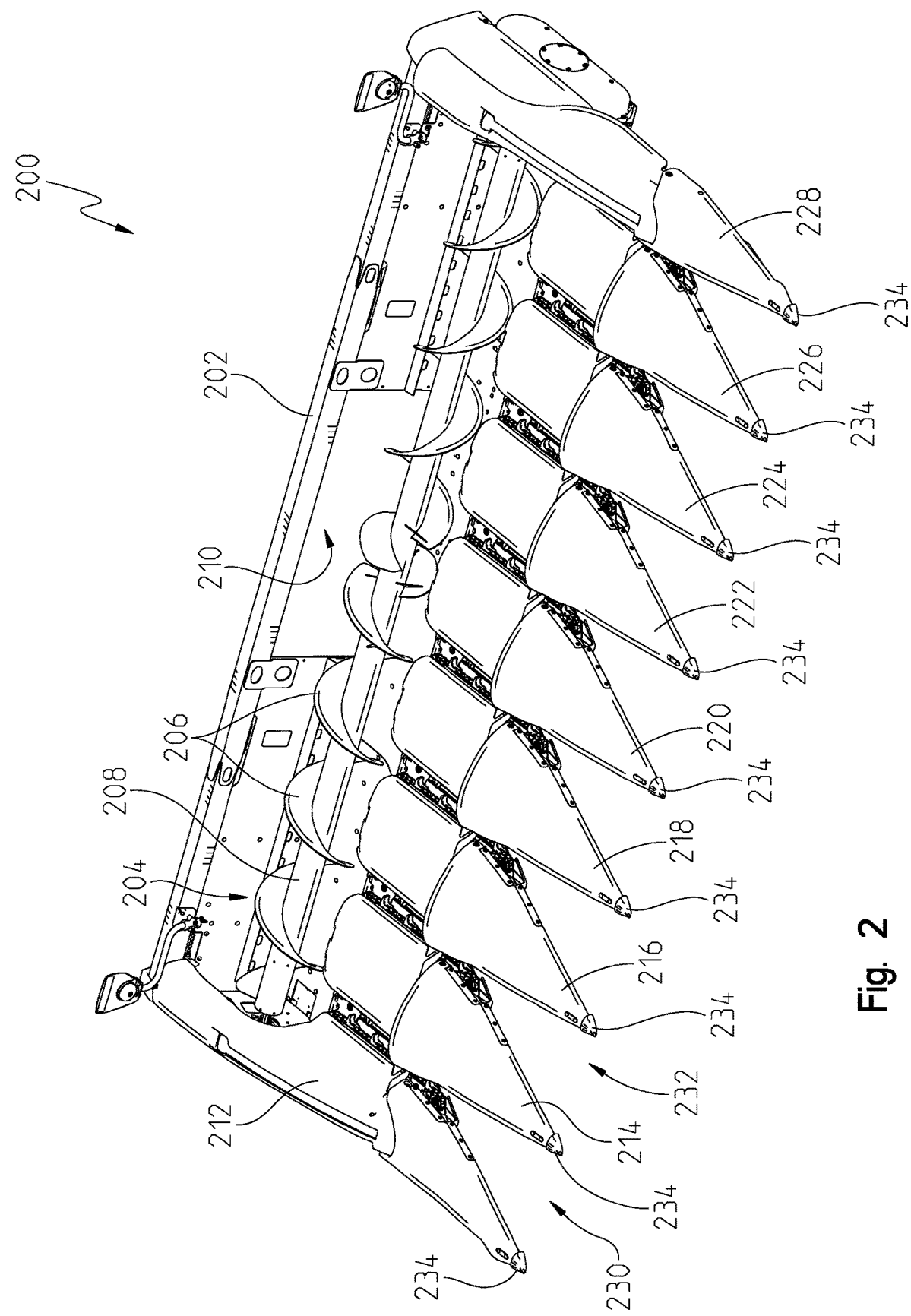
FIG. 2 is a perspective view of an example implementation of an agricultural header for harvesting corn.

Referring to FIG. 2, one implementation of an agricultural header is shown. In this implementation, the agricultural header is depicted as a corn header 200. The corn header 200 is shown capable of cutting corn stalks and separating the ears from the corn stalks. As shown in FIG. 2, the corn header 200 includes a frame 202 that is configured to be coupled to a front end of an agricultural combine or harvester. The corn header 200 includes an auger 204 formed by an elongated tube 208 having various types of fighting 206. The auger 204 may be rotatably driven to move ears of corn separated from the stalks toward a central opening 210 where the ears are received in a feederhouse of the agricultural combine for further processing.

In the implementation of FIG. 2, the corn header 200 may include a plurality of crop dividers each spaced from one another along the frame 202 of the corn header 200. For example, in FIG. 2, the plurality of crop dividers includes a first crop divider 212, a second crop divider 214, a third crop divider 216, a fourth crop divider 218, a fifth crop divider 220, a sixth crop divider 222, a seventh crop divider 224, an eighth crop divider 226, and a ninth crop divider 228. In some implementations, the plurality of crop dividers may include fewer than nine crop dividers. In other implementations, the plurality of crop dividers may include more than nine crop dividers.

The plurality of crop dividers are coupled to the frame 202 of the corn header 200. As shown, each crop divider is spaced along the frame 202 from an adjacent crop divider to define an opening through which a crop plant may be received. In FIG. 2, for example, a first crop opening 230 is defined between the first crop divider 212 and the second crop divider 214. A second crop opening 232 is defined between the second crop divider 214 and the third crop divider 216. Although not specifically labeled in FIG. 2, there is a crop opening defined between adjacent crop dividers coupled along the frame 202.

Each crop divider, or snoot, is designed to help direct or guide a crop plant into one of the crop openings where the crop plant is received by the corn header 200. A corn plant, for example, is one type of crop plant that is generally planted in rows in a field. Due to the nature and physical makeup of the corn plant, the corn plant may fall or be blown over into an adjacent row. Crop in this condition is often referred to as downed crop. For example, wind or a lack of rain can contribute to the corn plant falling over. In some instances, the ear of the corn plant, which is generally heavier and bulkier than the rest of the corn stalk, may fall over and lie on the ground in the adjacent row. In this position, the corn plant is not in a desirable position to be processed by the corn header 200. Thus, to reposition the corn plant in a more desirable position, the corn header 200 includes the plurality of crop dividers to engage the downed crop with a tapered portion 234, as shown in the illustrated implementation of FIG. 2. The tapered portion 234 of each of the plurality of crop dividers may function like a wedge that is positioned on or just above the ground. As the agricultural combine or harvester moves through the field, the crop divider, e.g., the tapered portion 234, may engage and lift the stalk and, in some instances, the ear of the corn plant from the ground and position the corn plant in a desirable position for being received by the corn header 200 for processing.

With an agricultural combine or harvester having an agricultural header such as the corn header 200, there is a common problem encountered when harvesting a field in that the conventional crop divider is susceptible to breaking or being damaged. This is particularly the case as the tapered portion 234 of the crop divider forms a leading end of the corn header 200 and thus likely is the first to contact obstacles in a field such as drain tiles, fences, rocks, other equipment, debris, and washouts in ditches. The conventional crop divider is generally rigidly mounted to the header and is unable to absorb an impact with an obstacle without being damaged. Moreover, the tapered portion 234 of the conventional crop divider may be formed of a plastic material that can be damaged from contact with the ground or other obstacle.

When the conventional crop divider is damaged due to contacting the ground or an obstacle in the field, the agricultural combine or harvester is unable to continue harvesting until the damaged crop divider is repaired or replaced. This can be expensive and timely. Thus, it is desirable to provide a crop divider that is able to withstand an impact with the ground or an obstacle in the field without being damaged.

Figure 3:
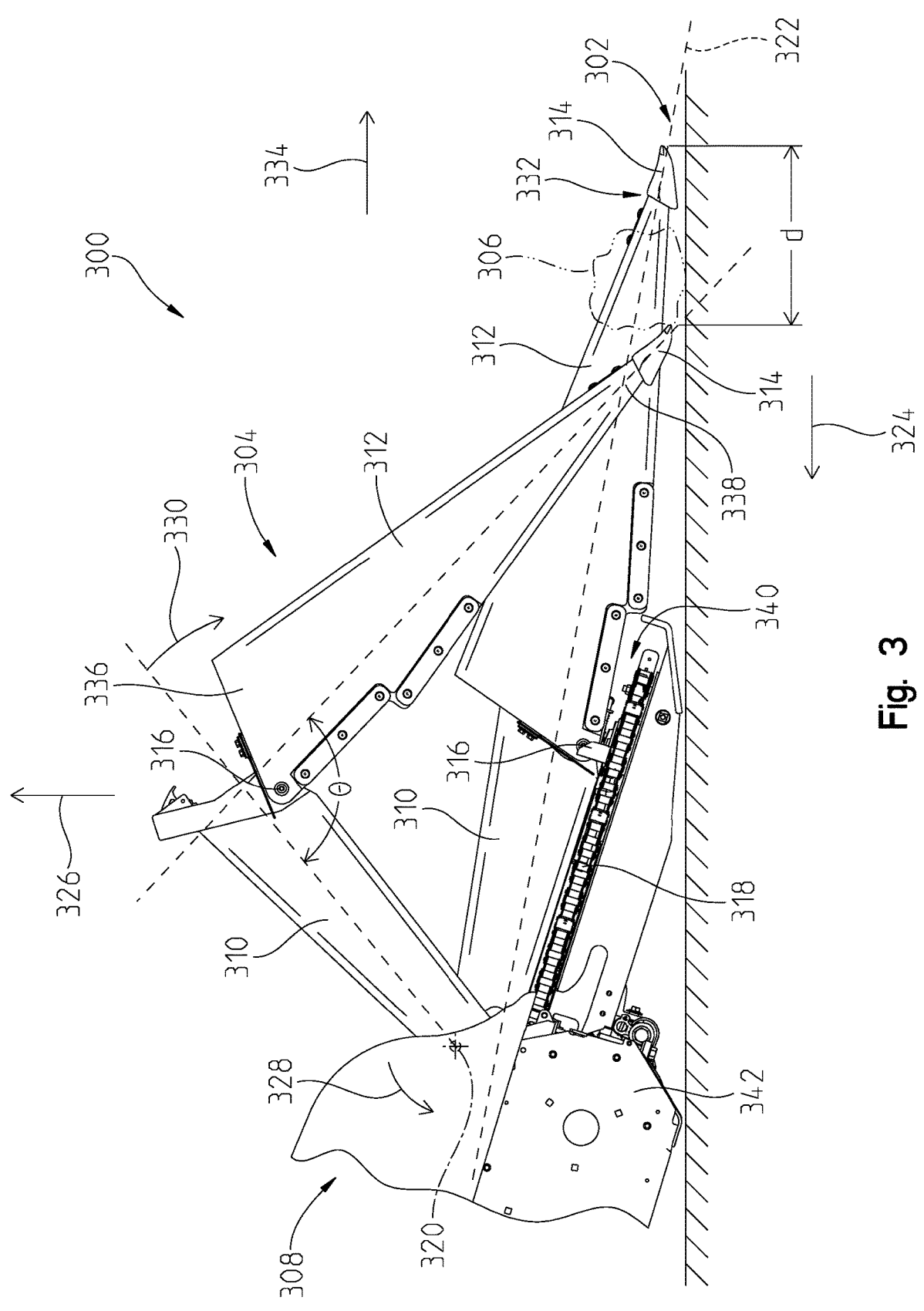
FIG. 3 is a side view of one example implementation of a crop divider on an agricultural header illustrated in a first position and a second position.

Referring to FIG. 3, one implementation of a crop divider assembly 300 is shown. The crop divider assembly 300 may be arranged adjacent to a separating assembly 340 on a header 308 that is coupled to an agricultural combine or harvester. The separating assembly 340 includes gathering chains 318 as shown in FIG. 3. The crop divider assembly 300 may assist with lifting or guiding fallen crop plants into the separating assembly 340 which may also include snapping rolls and stripping plates as described above. The crop plant may be guided by the crop divider assembly 300 into an opening 332 between the crop divider assembly 300 and an adjacent crop divider assembly where the crop plant is received by the separating assembly 340. The stalk of the crop plant (e.g., a corn plant) is cut, and the ear of the crop plant is separated from the stalk. The gathering chains 318 may include one or more paddles (see, e.g., a paddle 642 in FIG. 6) coupled thereto that assist with moving the crop plant rearwardly into the header 308 where the crop plant is cut via the separating assembly 340.

In the illustrated implementation of FIG. 3, the crop divider assembly 300 is capable of retracting temporarily or pivoting away from the normal, harvest position 302 to a retracted position 304. This movement of the crop divider assembly 300 may occur during a harvesting operation when the crop divider assembly 300 contacts the ground or an obstacle in the field during movement of the agricultural combine or harvester to which the header 308 that includes the crop divider assembly 300 is attached. As shown in FIG. 3, the crop divider assembly 300 includes at least a first portion 310 and a second portion 312. The first portion 310 is coupled to the header 308 as shown. In particular, the header 308 includes a frame 342 to which the first portion 310 is coupled. As also shown in FIG. 3, the first portion 310 and second portion 312 are pivotally coupled to one another via a first pivot location 316. In some implementations, the first portion 310 may be pivotally coupled to the header 308 at a second pivot location 320.

In the harvest position 302, the first portion 310 and second portion 312 may be generally disposed along an axis 322 as shown in FIG. 3. In other words, the first portion 310 and second portion 312 may be at least partially arranged relative to one another in an axial orientation. In the retracted position 304, the first portion 310 and second portion 312 are oriented so as to define an angle, Θ, therebetween, as shown in FIG. 3. In the illustrated implementation the angle Θ is an acute angle. In other implementations, the angle Θ may be another angle, such as an obtuse angle. In some implementations, the angle Θ is a non-straight angle.

In the illustrated implementation of FIG. 3, an end cap 314 is coupled to a forward end of the second portion 312 of the crop divider assembly 300. The end cap 314 may be formed of any material. In one example, the end cap 314 may be formed of cast iron and thus functions as a wear item on the crop divider assembly 300. Moreover, the crop divider assembly 300 is capable of moving between the harvest position 302 and the retracted position 304 during a harvesting operation. For example, the end cap 314 may be positioned relative to the second portion 312 of the crop divider assembly 300 such that the end cap 314 may come into contact with the ground or an object 306 or obstacle in the field during the harvesting operation. As the end cap 314 comes into contact with, for example, the object 306 or obstacle in the field, the crop divider assembly 300 may move from the harvest position 302 of FIG. 3 to the retracted position 304. In other words, the crop divider assembly 300 does not remain in the harvest position 302 when the end cap 314 contacts the object 306 because the crop divider assembly 300 is not rigidly held in the harvest position 302.

As further illustrated in FIG. 3, the first portion 310 of the crop divider assembly 300 is pivotally coupled to the header 308 via the second pivot location 320 and the second portion 312 is pivotal with respect to the first portion 310 at the first pivot location 316. When the crop divider assembly 300 is in the harvest position 302 and moving in a forward travel direction 334 during a harvesting operation, for example, the end cap 314 may come into contact with the ground, an object 306 or an obstacle in the field. Upon contact with the object 306, for example, the end cap 314 is capable of moving in a rearward direction 324 by a distance, d, from the harvest position 302. During this rearward movement, the end cap 314 may move in a rearward direction 324 that is generally parallel to the ground from the harvest position 302 to the retracted position 304. In other words, the end cap 314 may remain at a similar distance from the ground as the end cap moves between the harvest position 302 and the retracted position 304. In other implementations, however, the end cap 314 may move downwardly and rearwardly from the harvest position 302 to the retracted position 304 upon contact with the object 306. In some implementations, the end cap 314 may move upwardly and rearwardly from the harvest position 302 to the retracted position 304 upon contact with the object 306. In several implementations, the end cap 314 of the crop divider assembly 300 may be in contact with the ground or within several inches thereof as the end cap moves between the harvest position 302 and the retracted position 304. In other implementations, the end cap 314 may remain in constant contact with the ground as the end cap 314 moves between the harvest position 302 and the retracted position 304. In yet other implementations, the end cap 314 may avoid contact with the ground or may intermittently contact the ground as the crop divider assembly 300 moves between the harvest position 302 and the retracted position 304. In any event, with the crop divider assembly 300 of FIG. 3, the end cap 314 of the crop divider assembly 300 may retract, partially or fully, from the harvest position 302 to the retracted position 304 upon contacting the object 306, the ground, or another obstacle in the path of the crop divider assembly 300.

In some implementations, the end cap 314 can move rearwardly by at least 24 inches (610 millimeters). In another implementation, the end cap 314 may move rearwardly by a distance between 12 to 24 inches (305 to 610 millimeters). In yet another implementation, the end cap 314 may move rearwardly by no more than 12 inches (305 millimeters). In still another implementation, the end cap 314 may move rearwardly by a distance between 6 to 12 inches (152 to 305 millimeters). In a further implementation, the end cap 314 may move rearwardly by 6 inches (152 millimeters) or less. In yet a further implementation, the end cap 314 may move rearwardly by 3 inches (76 millimeters) or less. Although example displacements are described, the scope of the disclosure is not so limited. Rather, in other implementations, the end cap 314 of the crop divider assembly 300 may be displaced by different amounts in response to contact with an object. Further, movement of the crop divider assembly 300 in a manner described herein allows the crop divider assembly 300 to move in response to contact with an object, thereby avoiding or reducing any damage as a result of the contact.

In addition to the end cap 314 moving in the rearward direction 324 upon contact with the object 306, the first portion 310 of the crop divider assembly 300 pivots in a first rotational direction 328 about the second pivot location 320. The second pivot location 320 defines a second pivot axis about which the first portion 310 pivots relative to the header 308. As shown in FIG. 3, the first rotational direction 328 corresponds to a counterclockwise rotation relative to the header 308. As the first portion 310 of the crop divider assembly 300 rotates about the second pivot location 320 and the end cap 314 moves in the rearward direction 324, a first end 336 of the second portion 312 which is pivotally coupled to the first portion 310 at the first pivot location 316 is raised in a generally upward direction 326 as shown. As the first end 336 is raised, a second end 338 of the second portion 312 to which the end cap 314 is coupled moves in the rearward direction 324 but otherwise remains at a generally constant position relative to the ground. Thus, the first portion 310 and second portion 312 of the crop divider assembly 300 pivot relative to one another about a first pivot axis which is defined through the first pivot location 316. As shown, the second portion 312 pivots in a second rotational direction 330 about the first pivot location 316. In the illustrated implementation of FIG. 3, the second rotational direction 330 corresponds to a clockwise rotational direction. The rotational movement of the first portion 310 and second portion 312 of the crop divider assembly 300 helps facilitate the rearward movement of the end cap 314 from the harvest position 302 to the retracted position 304.

As the end cap 314 retracts rearwardly, an operator of the agricultural combine or harvester may stop the operation of the agricultural combine or harvester. The operator may inspect the crop divider assembly 300 and/or remove the object from the path of travel of the crop divider assembly 300. Movement of the crop divider assembly 300 in the manner described in response to contact with an object avoids or reduces the risk of damage to the crop divider assembly 300. In any case, reaction of the crop divider assembly 300 in response to contact with the ground, an obstacle 306, or another object allows the crop divider assembly 300 to be returned to the harvest position 302 upon disengagement with the ground, obstacle 306, or object. In some instances, the operator may remove the item from the path of travel of the crop divider assembly 300. In any event, upon disengaging with the ground or object, or clearing the path of travel, the harvesting operation may continue without further delay.

In some instances, the first portion 310 and second portion 312 of the crop divider assembly 300 may have a weight such that gravity biases the crop divider assembly 300 to move from the retracted position 304 back to the harvest position 302 without any interaction from the operator. In other words, the first portion 310 may pivot relative to the header 308 but otherwise remains pivotally coupled thereto when an object or obstacle is contacted by the end cap 314. As previously described, the second portion 312 of the crop divider assembly 300 pivots and moves in the upward direction 326. In doing so, the end cap 314 moves rearwardly to the retracted position 304 as shown in FIG. 3. Due to gravity and the weight of the crop divider assembly 300, the end cap 314 is urged to move generally forwardly and the second portion 312 is urged to pivot relative to the first portion 310 about the first pivot location 316 in a direction opposite the second rotational direction 330 as the crop divider assembly 300 is biased to move from the retracted position 304 to the harvest position 302. In this implementation, no other feature or hardware may be provided for biasing or urging the crop divider assembly 300 to return to the harvest position 302 from the retracted position 304.

Figure 4:
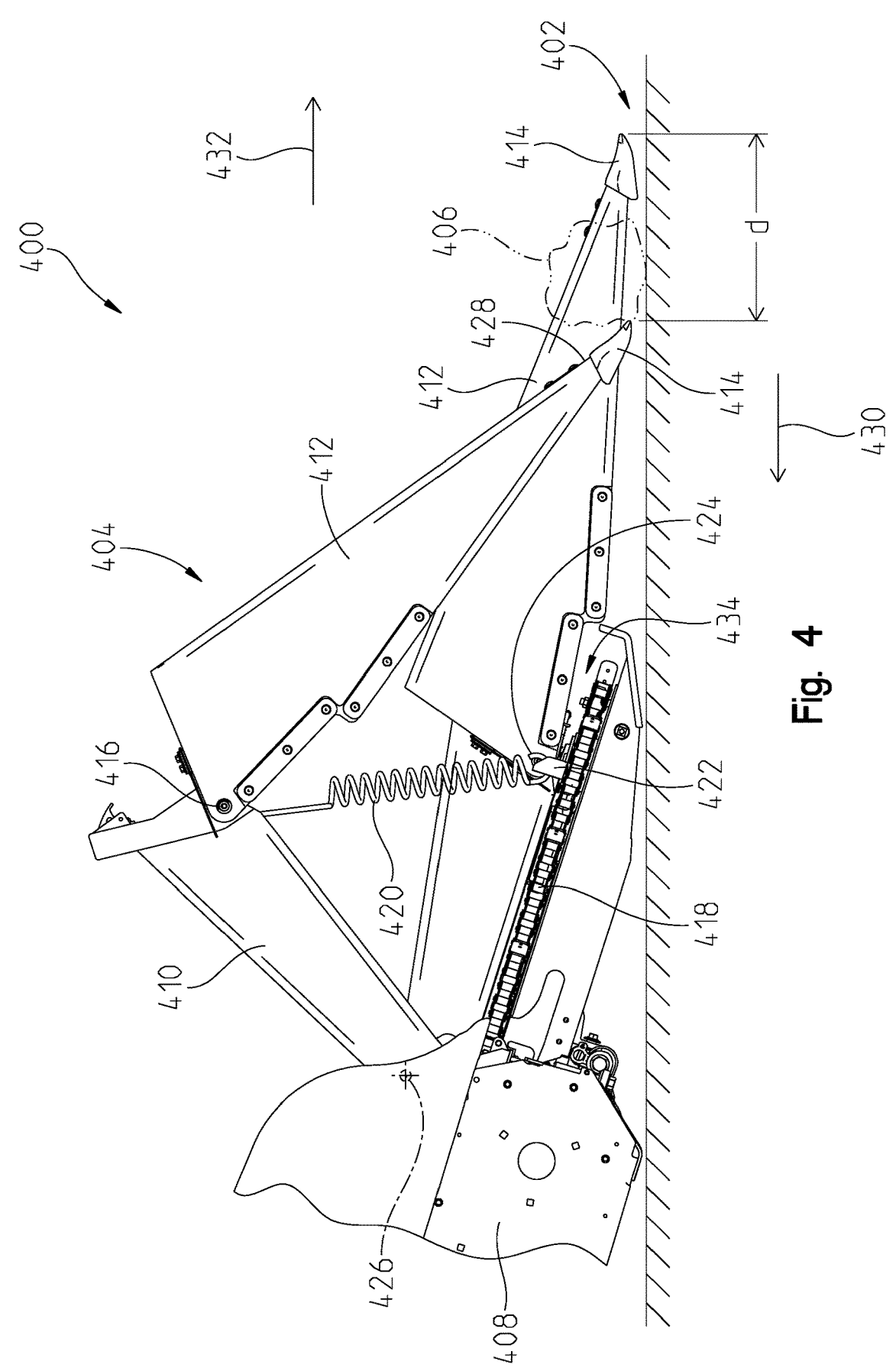
FIG. 4 is a side view of another example implementation of a crop divider on an agricultural header illustrated in a first position and a second position.

Referring to FIG. 4, another implementation of a crop divider assembly 400 is shown. The arrangement of the crop divider assembly 400 of FIG. 4 is similar to that of the crop divider assembly 300 of FIG. 3. As shown, the crop divider assembly 400 may be arranged adjacent to a separating assembly 434 on a header 408 that is configured to be coupled to an agricultural combine or harvester. The separating assembly 434 includes gathering chains 418 as shown in FIG. 4. The gathering chains 418 may be similar to the gathering chains 318 described above. The crop divider assembly 400 may assist with lifting or guiding fallen crop plants into the separating assembly 434. As also described above, the crop plant may be guided by the crop divider assembly 400 into the separating assembly 434 where the stalk of the crop plant (e.g., a corn plant) is cut and the grain or grains of the crop plant (e.g., an ear of a corn plant) is separated from the stalk. The gathering chains 418 then assist with moving the ear of the crop plant rearwardly to an auger, which may be similar to the auger 204 of FIG. 2.

Figure 5:
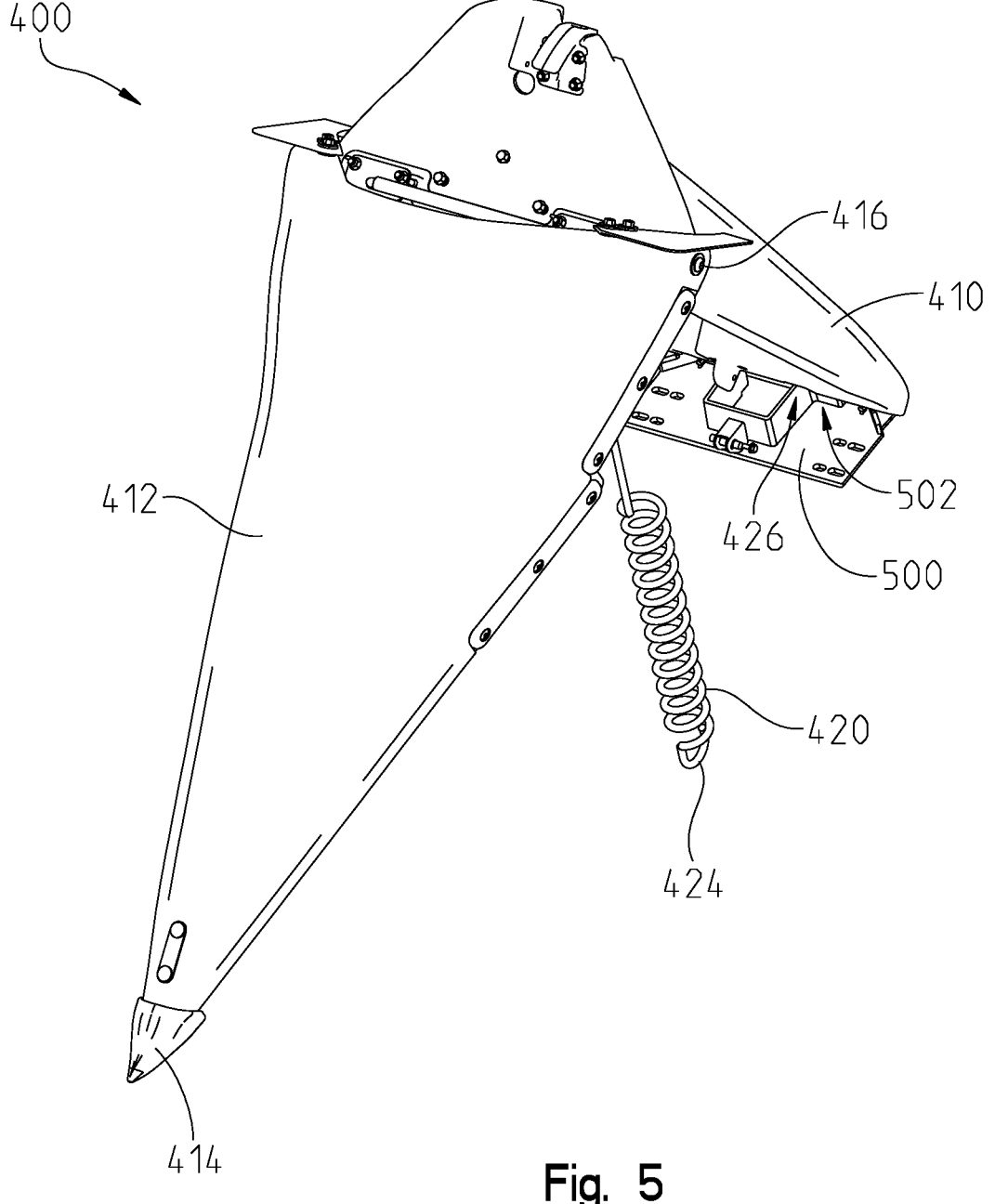
FIG. 5 is a front perspective view of the crop divider of FIG. 4 in the second position.
Figure 6:
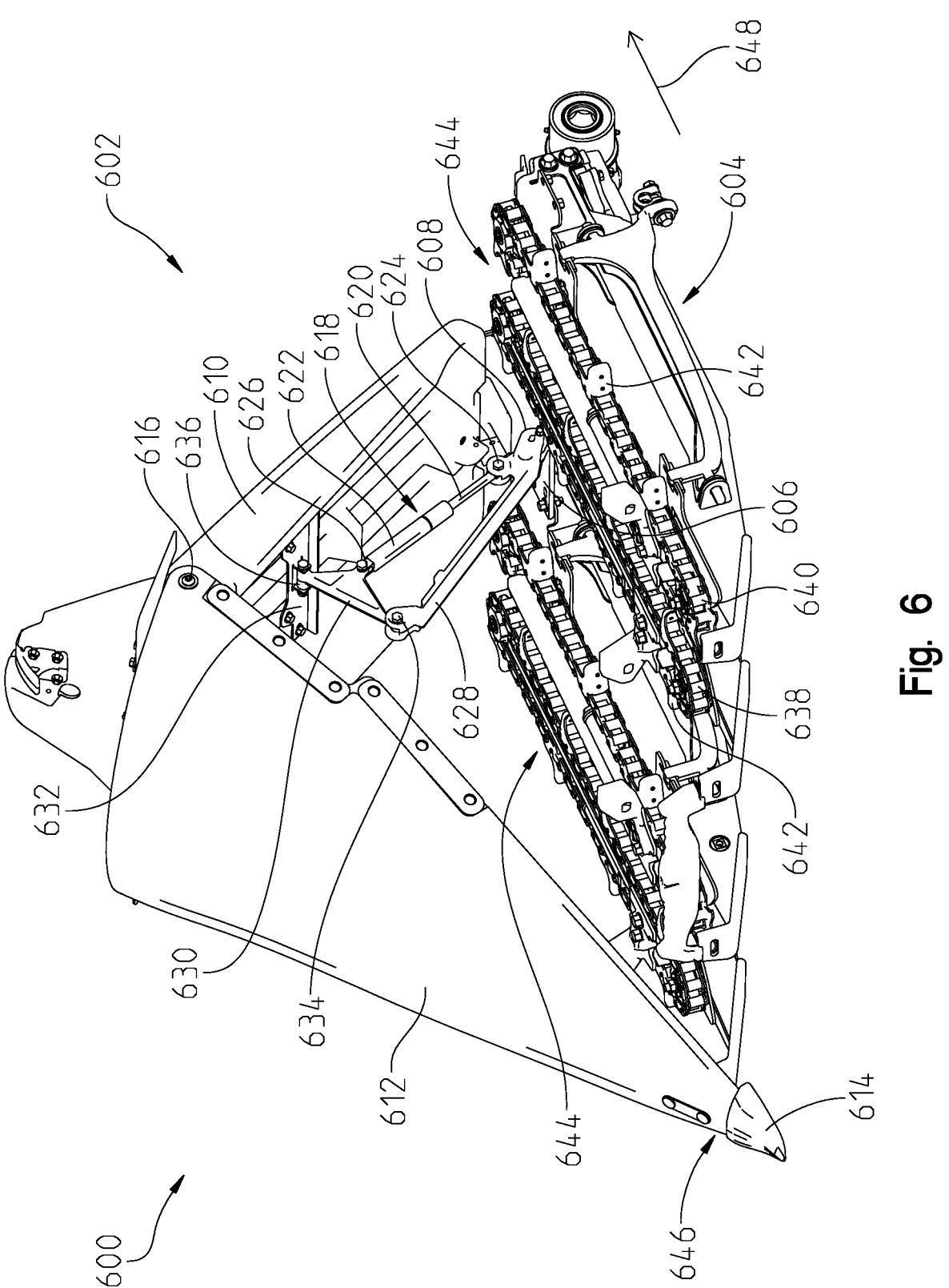
FIG. 6 is a perspective view of an example implementation of a crop divider in a third position according to the present disclosure.
Figure 8:
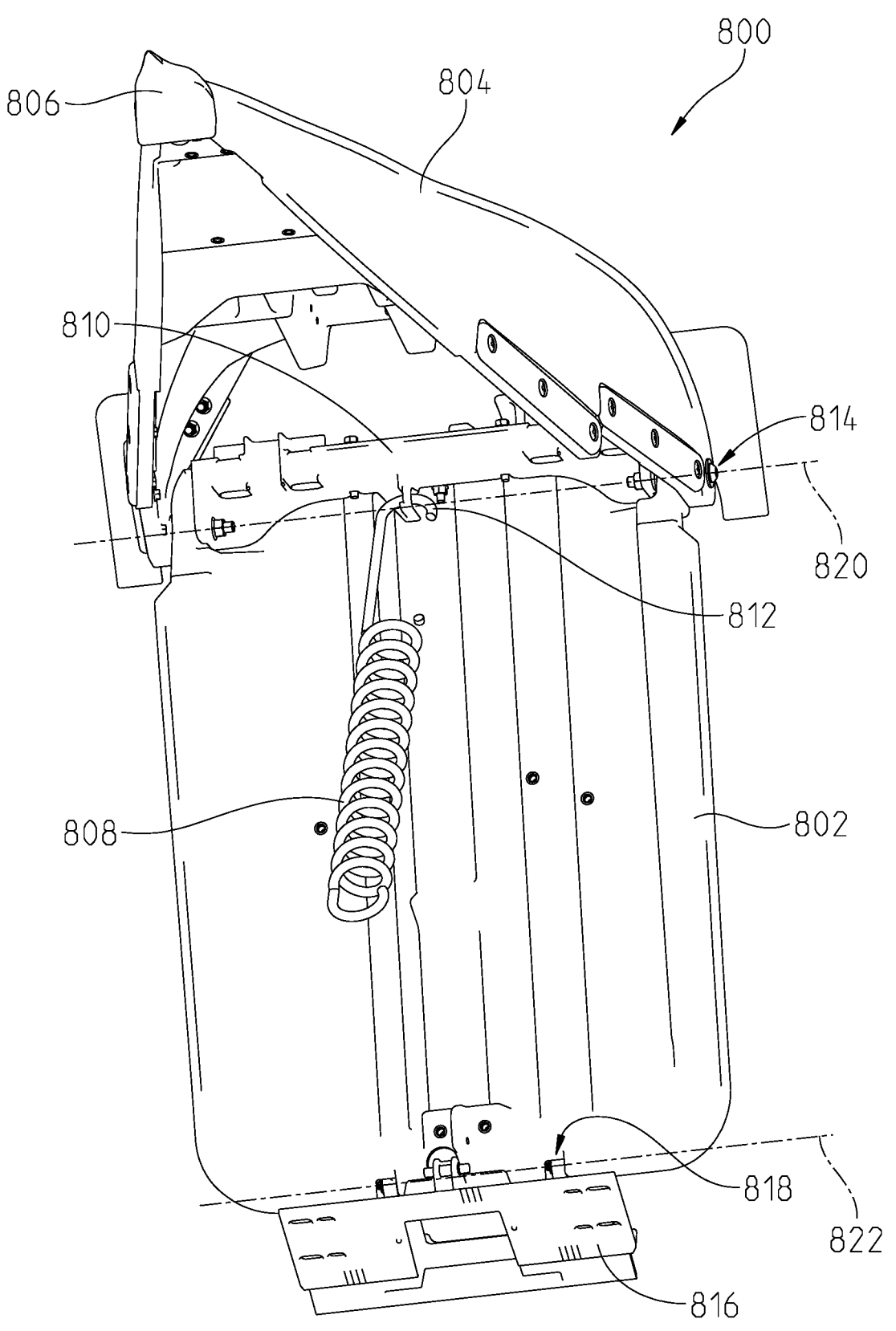
FIG. 8 is a partial perspective view of an example implementation of a crop divider according to the present disclosure.

In this implementation, the crop divider assembly 400 is capable of retracting or pivoting away from a harvest position 402 to a retracted position 404. This movement of the crop divider assembly 400 may occur, for example, during a harvesting operation. As shown, the crop divider assembly 400 is formed by a first portion 410 and a second portion 412. The first portion 410 is coupled to a header 408 such as, for example, a frame of the header 408. One or more examples of how the first portion 410 may be coupled to the header is illustrated in the implementations of FIGS. 5, 6 and 8. The first portion 410 and second portion 412 are pivotally coupled to one another via a first pivot location 416. In some implementations, the first portion 410 may be pivotally coupled to the header 408 at a second pivot location 426. The arrangement of the first portion 410 relative to the second portion 412 of the crop divider assembly 400 in the harvest position 402 and retracted position 404 may be similar to that described above with respect to the implementation of the crop divider assembly 300 shown in FIG. 3.

An end cap 414 is disposed at a forward end 428 of the second portion 412 of the crop divider assembly 400. The end cap 414 may be formed of any material. In one implementation, the end cap 414 may be formed of cast iron and thus functions as a wear item on the crop divider 400. The end cap 414 may be positioned such that the end cap 414 is capable of contacting an object 406 or obstacle in the field during the harvesting operation. As the end cap 414 comes into contact with, for example, the object 406 or obstacle in the field, the crop divider assembly 400 may move from the harvest position 402 of FIG. 4 to the retracted position 404. In other words, similar to the crop divider assembly 300 of FIG. 3, the crop divider assembly 400 does not remain in the harvest position 402 when the end cap 414 contacts the object 406 because the crop divider assembly 400 is not rigidly held in the harvest position 402.

As further illustrated in FIG. 4, the first portion 410 of the crop divider assembly 400 is pivotally coupled to the header 408 via the second pivot location 426 and the second portion 412 is pivotal with respect to the first portion 410 at the first pivot location 416. When the crop divider assembly 400 is in the harvest position 402 and moving in a forward travel direction 432 during a harvesting operation, for example, the end cap 414 may come into contact with the ground, an object 406 or an obstacle in the field. Upon contact with the object 406, for example, the end cap 414 is capable of moving in the rearward direction 430 by a distance, d, from the harvest position 402. During this rearward movement, the end cap 414 may move in a rearward direction 430 that is generally parallel to the ground from the harvest position 402 to the retracted position 404. In other words, the end cap 414 may remain at a similar distance from the ground as end cap 414 moves between the harvest position 402 and the retracted position 404. In other implementations, however, the end cap 414 may move downwardly and rearwardly from the harvest position 402 to the retracted position 404 upon contact with the object 406. In some implementations, the end cap 414 may move upwardly and rearwardly from the harvest position 402 to the retracted position 404 upon contact with the object 406.

In several implementations, the end cap 414 of the crop divider assembly 400 may be in contact with the ground or within several inches thereof as the end cap 414 moves between the harvest position 402 and the retracted position 404. In other implementations, the end cap 414 may remain in constant contact with the ground as the end cap 414 moves between the harvest position 402 and the retracted position 404. In yet other implementations, the end cap 414 may avoid contact with the ground or may intermittently contact the ground as the crop divider assembly 400 moves between the harvest position 402 and the retracted position 404. In any event, with the crop divider assembly 400 of FIG. 4, the end cap 414 of the crop divider assembly 400 may retract, partially or fully, from the harvest position 402 to the retracted position 404 upon contacting the object 406.

In FIG. 3, the crop divider assembly 300 is designed in such a way that the weight of the crop divider assembly 300 due to gravity biases the crop divider assembly 300 from the retracted position 304 to the harvest position 302 without any intervention by the operator of the agricultural combine. In the implementation of FIG. 4, however, a biasing member 420, such as a spring (e.g., a coil spring) is coupled between the crop divider assembly 400 and a location on the header 408 (e.g., a frame of the header). In FIG. 4, the header 408 may include structure forming a coupler 422 which includes an opening (not shown) for receiving a hook end 424 of the biasing member 420. Example couplers 422 include a tab, a clevis, or other structure to connect an end of a spring or other device to bias the crop divider assembly 400 in a selected direction. The biasing member 420 may be arranged such that as the crop divider assembly 400 moves to the retracted position 404, the biasing member 420 is extended. As such, the biasing member 420 may be designed to urge or bias the crop divider assembly 400 to move from the retracted position 404 to the harvest position 402 without any intervention by the operator. In some implementations, the combination of the weight of the crop divider assembly 400 and the biasing force from the biasing member 420 urges the crop divider assembly 400 to the harvest position 402.

In addition to biasing the crop divider assembly 400 to return to the harvest position 402 during a harvesting operation, the biasing member 420 may also dampen or reduce vibration or bouncing of the crop divider assembly 400 when an object or bump or other ground topography is encountered by the crop divider assembly 400. Thus, the biasing member 420 may provide a dampening effect to the crop divider assembly 400. While a spring is shown as one example of a biasing member 420, other examples may include a hydraulic actuator, an electric actuator, a pneumatic actuator, or another type of actuator.

In FIG. 8, for example, an implementation of a crop divider assembly 800 is shown having a first portion 802 and a second portion 804 pivotally coupled to one another about a first pivot location 814. In one example, the first pivot location 814 may be formed as a hinge. The second portion 804 may include an end cap 806 as shown. The end cap 806 may be similarly positioned on the second portion 804 as the end caps 314 and 414 of FIGS. 3 and 4, respectively.

In this implementation, the crop divider assembly 800 includes a biasing member 808 similar to the biasing member 420 described above with respect to the illustrated implementation of FIG. 4. The biasing member 808 is a spring as shown. In other implementations, the biasing member may be an actuator such as a hydraulic actuator or electric actuator. As shown in FIG. 8, the biasing member 808 includes a hook end 812 that is configured to engage in an opening formed in a coupler (e.g., a tab or clevis) of the crop divider assembly 800. Here, the crop divider assembly 800 includes an arm portion 810 formed in either the first portion 802 or the second portion 804. The coupler is formed as part of the arm portion 810. The hook end 812 of the biasing member 808 may couple to the arm portion 810 at a location adjacent to or along a first pivot axis 820 formed by the first pivot location 814. In other words, in at least one implementation, the biasing member 808 is coupled at or near the first pivot axis 820 that is formed by the first pivot location 814 between the first portion 802 and second portion 804 of the crop divider assembly 800.

As also shown, the first portion 802 of the crop divider assembly 800 is pivotally coupled at a second pivot location 818 via a plate 816 to a frame of a header (not shown). The header may be similar to the header 308 of FIG. 3 or the header 408 of FIG. 4. The pivotal connection between the first portion 802 of the crop divider assembly 800 and the header may be similar to the pivotal connection between the first portion 410 of the crop divider assembly 400 of FIG. 4 and the header 408 where a second pivot location 426 is formed between the first portion 410 and the header frame 408. The second pivot location 426 is better illustrated in FIG. 5. In the implementation of FIG. 5, for example, a plate 500 is coupled to the header 408. In one example, the second pivot location 426 may form a hinge 502 that is formed between the plate 500 and the first portion 410 of the crop divider assembly 400. In one implementation, the hinge 502 may couple to the plate 500 which in turn is coupled to the frame on the header 408. In the same way with respect to the illustrated implementation of FIG. 8, the first portion 802 of the crop divider assembly 800 is pivotally connected to the header via the second pivot location 818. A second pivot axis 822 is defined at the second pivot location 818, and the first portion 802 can pivot about the second pivot axis 822 relative to the header between a harvest position, a retracted position, and a transport position (i.e., similar to the implementation of a crop divider assembly 600 shown in a transport position in FIG. 6 and described in more detail below).

In this disclosure, the transport position is generally a position in which the crop divider assembly may be configured to allow the header to be transported between fields or along a roadway. In the transport position, the header is not performing a harvesting operation but rather is being transported to a field or for storage. The overall width of the header is reduced in the transport position to allow the header to be more easily transported to a new location. In some instances, the width of the header is reduced in the transport position to meet federal, state, local or other governmental regulations.

Referring to FIG. 6, a further implementation of a crop divider assembly 600 is illustrated. In this implementation, the crop divider assembly 600 includes a first portion 610 and a second portion 612 pivotally coupled to one another at a first pivot location 616. In one example, the first pivot location 616 may be formed as a hinge. The second portion 612 includes an end cap 614 at a leading end 646 of the crop divider assembly 600.

During a harvesting operation, the crop divider assembly 600 may be positioned in a harvest position similar to the harvest positions 302 and 402 of FIGS. 3 and 4, respectively. In the harvest position, the crop divider assembly 600 moves through a field of planted crop where the crop divider 600 may engage with one or more crop plants such as a corn plant. As described above, the crop divider assembly 600 can guide the crop plant into a separating assembly 644 that is disposed adjacent to one or both sides of the crop divider assembly 600. With a corn plant, for example, the separating assembly 644 includes a mechanism such as snapping rolls and stripping plates for cutting the stalk of the plant from the ground and separating the ear of the corn plant from the stalk. The separating assembly 644 includes gathering chains including a first gathering chain 638 and a second gathering chain 640. Each gathering chain is driven about two gears or pulleys and moves one or more paddles 642 that are coupled to each gathering chain. Each of the paddles 642 may guide the separated ear of the corn plant in a rearward direction indicated by arrow 648 toward an auger (e.g., the auger 204 in FIG. 2) and feederhouse (not shown) of the agricultural combine.

The first portion 610 and second portion 612 of the crop divider assembly 600 may form partially hollow housings. As shown in FIG. 6, the underside of the first portion 610 is at least partially open, for example, to accommodate hardware or other features for moving the crop divider assembly 600 between the harvest position and the retracted position. This will be described in further detail below.

The first portion 610 of the crop divider assembly 600 is pivotally coupled to a header 604 (e.g., a frame of the header). The header 604, for example, may be a corn header or any other type of agricultural header that is coupled to an agricultural machine such as an agricultural combine or harvester. The header 604 includes a plate 606 such as a hinge plate to which the first portion 610 of the crop divider assembly 600 is pivotally coupled. The first portion 610 is pivotally coupled to the plate 606 at a second pivot location 608. In one example, the second pivot location 608 may be formed as a hinge.

Figure 7:
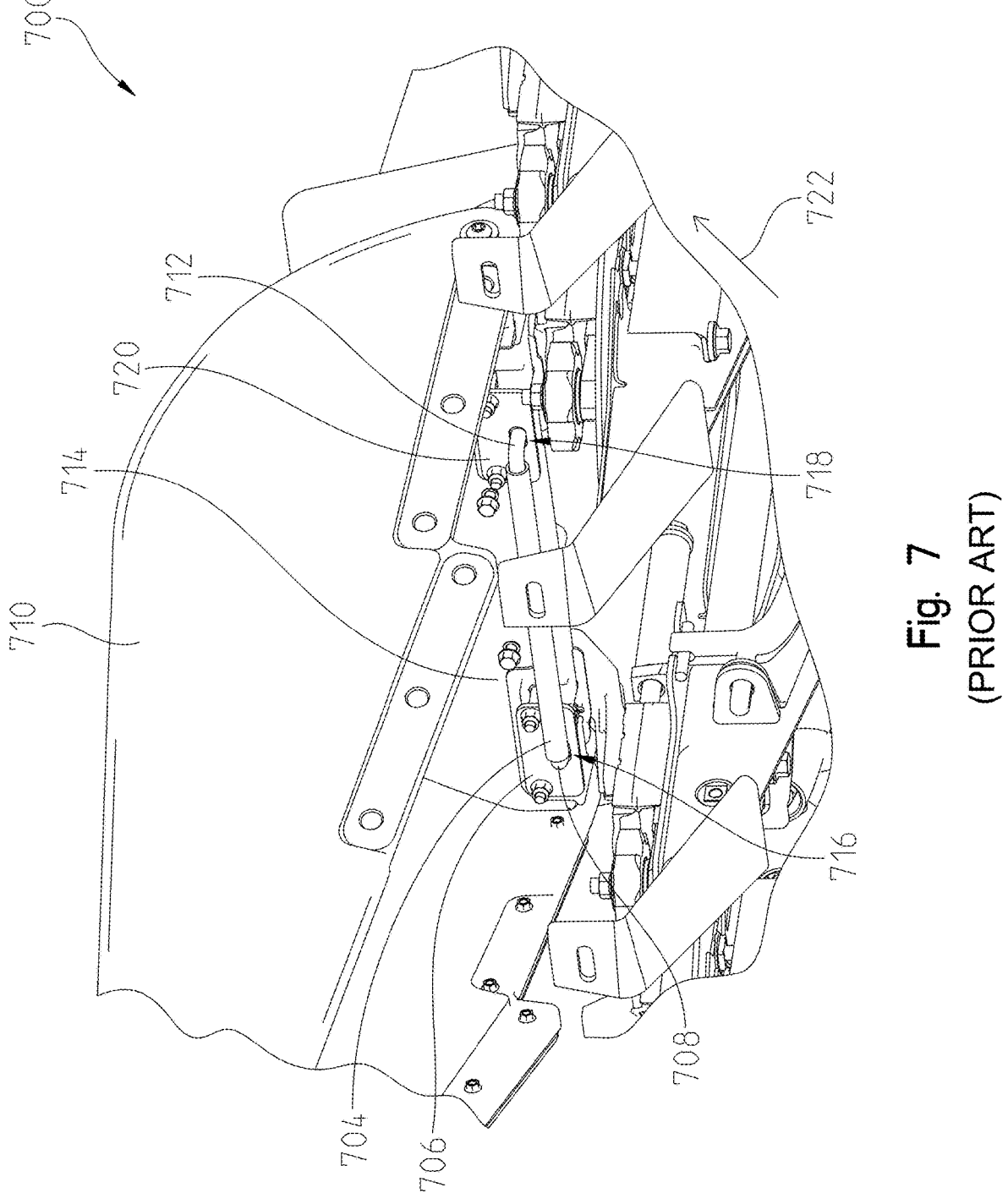
FIG. 7 is a partial perspective view of a conventional locking system on a crop divider.

As described above, a conventional crop divider assembly is rigidly mounted to the frame of the header. Thus, during a harvesting operation, the conventional crop divider is rigidly held in the harvest position even when the conventional crop divider assembly 700 comes into contact with the ground, an object, or an obstacle. When the header is being transported between fields or along a roadway, for example, and therefore is not performing a harvesting operation, the conventional crop divider assembly can be manually repositioned into a transport position. In FIG. 7, for example, a portion of an underside of a conventional crop divider assembly 700 is shown. The conventional crop divider assembly 700 includes a portion 710 similar to the first portion 610 or second portion 612 of the crop divider assembly 600 of FIG. 6. Partially enclosed within the portion 710 of the conventional crop divider assembly 700 is a bar 704 that may be manually moved between an engaged position and a disengaged position. The bar 704 includes ends that extend through openings formed in plates. For example, in FIG. 7, the bar 704 includes a first end 708 that extends through a first opening 716 formed in a first plate 706. The bar 704 also includes a second end 712 that extends through a second opening 718 formed in a second plate 720. The first plate 706 and the second plate 720 are affixed to a frame 714 of the header to which the conventional crop divider assembly 700 is coupled.

In the conventional crop divider assembly 700, when the bar 704 is pushed inwardly in a direction indicated by arrow 722, the first and second ends 708, 712 of the bar 704 are positioned in the first and second openings 716, 718, respectively, such that the bar 704 is in the engaged position. In the engaged position, the bar 704 rigidly connects the conventional crop divider assembly 700 to the frame 714 so that the conventional crop divider assembly 700 is unable to move relative to the frame 714. In other words, the bar 704 is disposed in the engaged position when the conventional crop divider assembly 700 is in the harvest position. With the bar 704 engaged with the frame 714 in the engaged position, the conventional crop divider assembly 700 is rigidly mounted to the header and is unable to retract from the harvest position even when the conventional crop divider assembly 700 contacts the ground, an object or an obstacle in the field. For this reason, the conventional crop divider assembly 700 may easily break or suffer damage when the conventional crop assembly 700 contacts an object in the field. When the bar 704, however, is moved to the disengaged position and the ends 708, 712 are removed from the openings 716, 718, the conventional crop divider assembly 700 may be moved from the harvest position to the transport position.

Returning to FIG. 6 of the present disclosure, the crop divider assembly 600 is able to be configured in a harvest position, a retracted position, and a transport position 602. In the harvest position, the crop divider assembly 600 may be positioned similar to the manner in which the crop divider assemblies 300, 400 of FIGS. 3 and 4, respectively, are movable to a harvest position 302, 402. Moreover, the crop divider assembly 600 of FIG. 6 can be moved to a retracted position similar to the retracted positions 304 and 404 of FIGS. 3 and 4, respectively. In FIG. 6, the crop divider assembly 600 is shown in the transport position 602. To maintain the crop divider assembly 600 in the transport position 602 of FIG. 6, the crop divider assembly 600 does not include the bar 704 and ends 708, 712 of the conventional crop divider assembly 700 of FIG. 7. Instead, a biasing member 618 such as an actuator is used to maintain or hold the crop divider assembly 600 in the transport position 602. In some examples, the biasing member 618 may be a mechanical actuator, a hydraulic actuator, an electric actuator, a pneumatic actuator, or another type of actuator. In one example, the biasing member 618 may be an actuator that is manually actuated by an operator to move the crop divider assembly 600 between the harvest position and transport position 602. In other examples, the biasing member 618 may be a spring such as, for example, a coil spring. In some examples, the biasing member 618 may be a second biasing member that is different from the biasing member 420 of FIG. 4. In other examples, the biasing member 618 may be the same as the biasing member 420 of FIG. 4.

The biasing member 618 is coupled at one end to the frame 604 via a rod portion 620 and at an opposite end to the crop divider assembly 600 via a cylinder portion 622. The rod portion 620 is pivotally coupled to the frame 604 at a first pivot location 624 and the cylinder portion 622 is pivotally coupled to the crop divider assembly 600 at a second pivot location 626. The cylinder portion 622 may partially enclose the rod portion 620 as the rod portion 620 extends and retracts relative to the cylinder portion 622. In a fully or partially extended position, the biasing member 618 may hold the crop divider assembly 600 in the transport position 602 and prevent the crop divider assembly 600 from returning to the harvest position. In some examples, the rod portion 620 may be located between the fully extended position and fully retracted position to hold the crop divider assembly 600 in the transport position 602. In another example, the rod portion 620 may be fully extended to hold the crop divider assembly 600 in the transport position 602. In yet other examples, the rod portion 620 may be at least partially extended to hold the crop divider assembly 600 in the transport position 602.

The second pivot location 626 is formed as part of a bracket 630 as shown in FIG. 6. The bracket 630 may form a plurality of pivot locations including the second pivot 626. For example, the bracket 630 is coupled to an arm 628 at a third pivot location 634. The arm 628 is pivotally coupled at one end to the bracket 630 and at an opposite end thereof to the frame 604 at the first pivot location 624. Thus, the biasing member 618 and the arm 628 are pivotally coupled to the frame 604 at the first pivot location 624.

In the implementation of FIG. 6, an underside of the first portion 610 of the crop divider assembly 600 includes a flange 632. The bracket 630 is pivotally coupled to the flange 632 at a fourth pivot location 636 as shown. In other words, the biasing member 618 and arm 628 are pivotally coupled to the first portion 610 of the crop divider assembly 600 via the bracket 630 and flange 632. In one example, the bracket 630 may include a triangular design where the second, third and fourth pivot locations 626, 634, 636, respectively, are located at approximately each of the three corners of the bracket 630. In this example, each of the three pivot locations 626, 634, 636 are spaced from one another at different locations on the bracket 630.

With the biasing member 618 and the arm 628, the crop divider assembly 600 of FIG. 6 is held in the transport position 602 in a different manner than the crop divider assembly 700 of FIG. 7. In the implementation of FIG. 6, the crop divider assembly 600 can be positioned in a harvest position 302, 402 similar to the crop divider assemblies 300, 400 shown in FIGS. 3 and 4, a transport position 602 as shown in FIG. 6, and a retracted position 304, 404 as shown in FIGS. 3 and 4.

In one implementation, the end cap 614 of the crop divider assembly 600 is at a fully extended position when the crop divider assembly 600 is in the harvest position. The end cap 614 is moved rearward of the fully extended position when the crop divider assembly 600 is in the retracted position and the transport position 602. In one example, the end cap 614 may be located the same distance rearward from the fully extended position when the crop divider assembly 600 is in the retracted position and the transport position 602. In another example, the end cap 614 may move further rearward from the fully extended position when the crop divider assembly 600 is in the retracted position compared to the transport position 602. In a further example, the end cap 614 may move further rearward from the fully extended position when the crop divider assembly 600 is in the transport position 602 compared to the retracted position. In any event, as described above, the end cap 614 is biased to return to the harvest position when the crop divider assembly 600 is in the retracted position, and due to gravity, a biasing member, or a combination thereof, the end cap 614 is able to move forward from the retracted position to the harvest position when the crop divider assembly 600 is no longer in contact with the ground, an object, or an obstacle in the field. On the other hand, when the crop divider assembly 600 is in the transport position 602, the crop divider assembly 600 is held in place with respect to the frame 604 of the header and the end cap 614 is unable to move forward to the harvest position.

As previously described, the crop divider assembly 600 may include in some implementations a biasing member 420 that returns the crop divider assembly 600 from the retracted position to the harvest position. In other implementations, the weight of the crop divider assembly 600 and gravity may bias the crop divider assembly 600 to move from the retracted position to the harvest position. Moreover, in some examples, the crop divider assembly 600 may include a second biasing member 618 such as an actuator, an arm, or a spring for holding the crop divider assembly 600 in the transport position 602 when the header is being moved during a transport or non-harvesting operation.

While exemplary implementations incorporating the principles of the present disclosure have been described herein, the present disclosure is not limited to such implementations. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A crop divider assembly of an agricultural header comprising:
    a first portion configured to be pivotally coupled to a frame of the header; and
    a second portion comprising:
        a first end forming a leading end of the crop divider assembly; and
        a second end pivotally coupled to the first portion;
    the crop divider assembly being moveable between a first configuration and a second configuration in response to contact with an object during a harvesting operation, where in the first configuration the first portion and the second portion are at least partially axially aligned with one another and the first end is in a fully extended position, and in the second configuration the second portion is pivoted relative to the first portion and the first end is freely moved rearwardly from the fully extended position to a retracted position;
    wherein the first end freely moves from the retracted position to the fully extended position upon disengagement with the object and in response to the crop divider assembly being biased to the first configuration.

2. The crop divider assembly of claim 1, wherein the first end is freely movable between the fully extended position and the retracted position.

3. The crop divider assembly of claim 1, wherein, between the first configuration and the second configuration, the first end moves along a generally horizontal path between the fully extended position and the retracted position.

4. The crop divider assembly of claim 3, wherein the first end is raised as the crop divider assembly moves from the fully extended position to the retracted position.

5. The crop divider assembly of claim 1, wherein the first portion and second portion are pivotally coupled at a first pivot location; and wherein, the first pivot location moves upwardly when the crop divider assembly is moved from the first configuration to the second configuration.

6. The crop divider assembly of claim 1, further comprising a biasing member comprising:

a first end; and a second end, opposite the first end, wherein the first end is coupled to one of the first portion or the second portion and the second end is configured to be coupled to the frame, and wherein the biasing member biases the crop divider assembly to the first configuration.

7. The crop divider assembly of claim 6, wherein the biasing member comprises a spring or an actuator.

8. The crop divider assembly of claim 6, wherein the first portion and second portion are pivotally coupled at a first pivot location that defines a pivot axis, and wherein the biasing member is coupled to the first portion or second portion along the pivot axis.

9. A crop divider assembly of an agricultural header comprising:

a first portion configured to be pivotally coupled to a frame of the header; and a second portion comprising:

a first end forming a leading end of the crop divider assembly; and a second end pivotally coupled to the first portion;

the crop divider assembly being moveable to a first configuration in which the first portion and the second portion are at least partially axially aligned with one another and the first end is in a fully extended position, a second configuration in response to contact with an object in which the second portion is pivoted relative to the first portion and the first end is moved rearwardly from the fully extended position to a retracted position, and a third configuration in which the second portion is pivoted relative to the first portion and the first end is positioned rearward from the fully extended position;

the crop divider assembly being biased to the first configuration such that when the crop divider assembly is in the second configuration, the first end is freely movable from the retracted position to the fully extended position upon disengagement with the object and in response to the crop divider assembly being biased to the first configuration.

10. The crop divider assembly of claim 9, wherein, when the crop divider assembly is in the third configuration, the first end is unable to freely move to the fully extended position.

11. The crop divider assembly of claim 9, wherein the first end is freely movable between the fully extended position and the retracted position.

12. The crop divider assembly of claim 10, further comprising a biasing member comprising:

a first end; and a second end, opposite the first end, wherein the first end is coupled to one of the first portion or the second portion and the second end is configured to be coupled to the frame, and wherein, the biasing member biases the crop divider assembly to the first configuration.

13. The crop divider assembly of claim 12, wherein the first portion and second portion are pivotally coupled at a first pivot location that defines a pivot axis, and wherein the biasing member is coupled to the first portion or second portion along the pivot axis.

14. The crop divider assembly of claim 9, further comprising:

a bracket pivotally coupled to the first portion;

a biasing member pivotally coupled at a first end to the bracket and configured to be pivotally coupled at a second end opposite the first end to the frame, and an arm pivotally coupled at a first end to the bracket and configured to be pivotally coupled at a second end opposite the first end to the frame, wherein, the biasing member is movable between a retracted position and an extended position, and wherein, in the extended position, the crop divider assembly is in the third configuration.

15. The crop divider assembly of claim 14, wherein the bracket is pivotally coupled to a flange of the first portion.

16. An agricultural header for feeding separated crop to a harvester comprising:

a frame;

a plurality of crop divider assemblies coupled to the frame, each of the plurality of crop divider assemblies being spaced from another of the plurality of crop divider assemblies, each of the crop divider assemblies comprising:

a first portion pivotally coupled to the frame; and a second portion pivotally coupled to the first portion, the second portion comprising:

a first end forming a leading end of the crop divider assembly; and a second end pivotally coupled to the first portion;

each crop divider assembly of the plurality of crop divider assemblies being moveable between a first configuration and a second configuration in response to contact with an object during a harvesting operation, where in the first configuration the first portion and the second portion are at least partially axially aligned with one another and the first end is in a fully extended position, and in the second configuration the second portion is pivoted relative to the first portion and the first end is moved rearwardly from the fully extended position to a retracted position, and each crop divider assembly of the plurality of crop divider assemblies being biased to the first configuration such that, when the crop divider assembly is in the second configuration, the first end freely moves from the retracted position to the fully extended position upon disengagement with the object and in response to the crop divider assembly being biased to the first configuration.

17. The agricultural header of claim 16, wherein each crop divider assembly of the plurality of crop divider assemblies is moveable to a third configuration during a non-harvesting operation in which the second portion is pivoted relative to the first portion and the first end is positioned rearward from the fully extended position.

18. The agricultural header of claim 17, wherein, when the crop divider assembly is in the third configuration, the first end is unable to freely move to the fully extended position.

19. The agricultural header of claim 16, wherein the first end of each crop divider assembly of the plurality of crop divider assemblies is freely movable between the fully extended position and the retracted position.

* * * * *